United States Patent [19]
Lawlor et al.

[11] Patent Number: 6,038,677
[45] Date of Patent: Mar. 14, 2000

[54] AUTOMATIC RESOURCE GROUP FORMATION AND MAINTENANCE IN A HIGH AVAILABILITY CLUSTER CONFIGURATION

[75] Inventors: Francis D. Lawlor, Austin; James Wendell Arendt, Round Rock, both of Tex.; Hovey Raymond Strong, San Jose, Calif.

[73] Assignee: International Business Machines Corporation, Armonk, N.Y.

[21] Appl. No.: 08/829,569

[22] Filed: Mar. 31, 1997

[51] Int. Cl.⁷ .............................. G06F 13/00; H01J 13/00
[52] U.S. Cl. ................................ 714/4; 709/226
[58] Field of Search .................. 395/182.02, 182.09, 395/182.1, 182.11, 182.13, 182.14, 182.16, 182.18; 707/202, 203; 714/4, 9, 12, 2, 3; 709/220, 226

[56] References Cited

U.S. PATENT DOCUMENTS

| | | | |
|---|---|---|---|
| 4,377,000 | 3/1983 | Staab | 395/185.08 |
| 4,837,680 | 6/1989 | Crockett et al. | 364/200 |
| 5,003,464 | 3/1991 | Ely et al. | 395/182.09 |
| 5,187,787 | 2/1993 | Skeen et al. | 395/600 |
| 5,263,157 | 11/1993 | Janis | 395/600 |
| 5,327,553 | 7/1994 | Jewett et al. | 395/575 |
| 5,361,347 | 11/1994 | Glider et al. | 395/183.2 |
| 5,488,716 | 1/1996 | Scheider et al. | 395/182.08 |
| 5,526,492 | 6/1996 | Ishida | 395/182.11 |
| 5,615,329 | 3/1997 | Kern et al. | 395/182.04 |
| 5,625,820 | 4/1997 | Hermsmeier et al. | 395/182.14 |
| 5,689,633 | 11/1997 | Cotner et al. | 395/182.14 |
| 5,692,119 | 11/1997 | Koguchi et al. | 395/182.11 |
| 5,696,895 | 12/1997 | Hemphill et al. | 395/182.11 |
| 5,704,032 | 12/1997 | Badovinatz et al. | 395/182.09 |
| 5,732,266 | 3/1998 | Moore et al. | 395/651 |
| 5,734,817 | 3/1998 | Roffe et al. | 395/182.13 |

FOREIGN PATENT DOCUMENTS 9618149  6/1996  WIPO .............................. G06F 9/46

OTHER PUBLICATIONS

"Virtual Machine Interface/Virtual Resource Manager," IBM Technical Disclosure Bulletin, vol. 30 No. 1, Jun. 1987, pp. 40–43.

*Primary Examiner*—Norman Michael Wright
*Attorney, Agent, or Firm*—Jeffrey S. LaBaw; David H. Judson

[57] ABSTRACT

A method and apparatus that automatically generates and maintains resource groups for a clustered computer network configuration. Resource groups are said to be generated "automatically" because the system administrator preferably is not directly involved with defining what resources go within a particular group. Rather, the administrator merely identifies a set of resources that must be collocated with a given application in the event of a failure of a computer on which the application is then executing. One or more resource groups are then automatically generated using a set of collocation "constraints" or rules. A first collocation constraint preferably enforces any user-defined collocations for a given application, and a second constraint collocates disk partition resources residing on the same physical disk. A resource group generated is this manner ensures effective fault-tolerant operation.

18 Claims, 4 Drawing Sheets

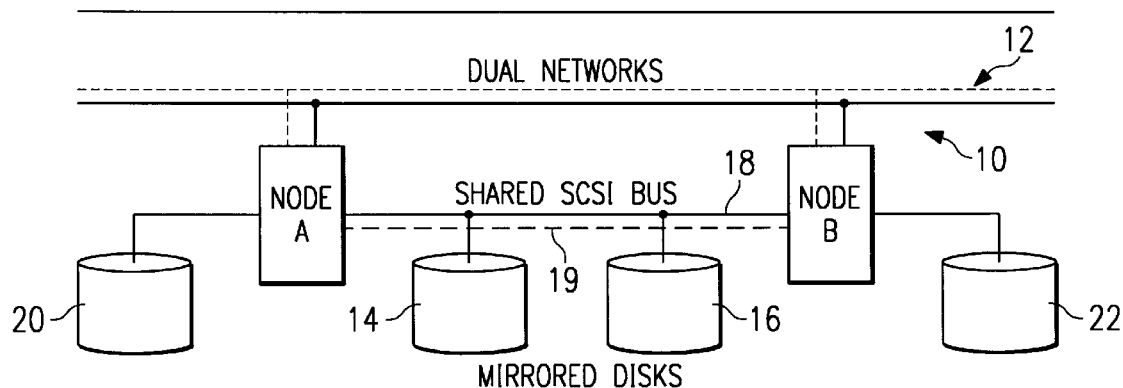
FIG. 1
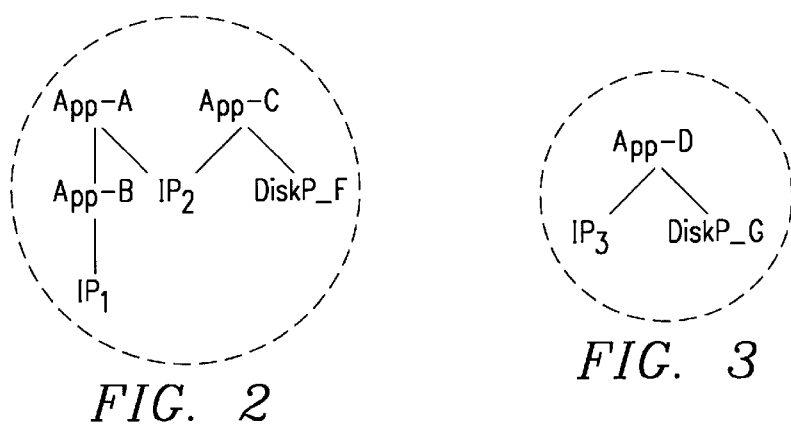
FIG. 2
FIG. 3
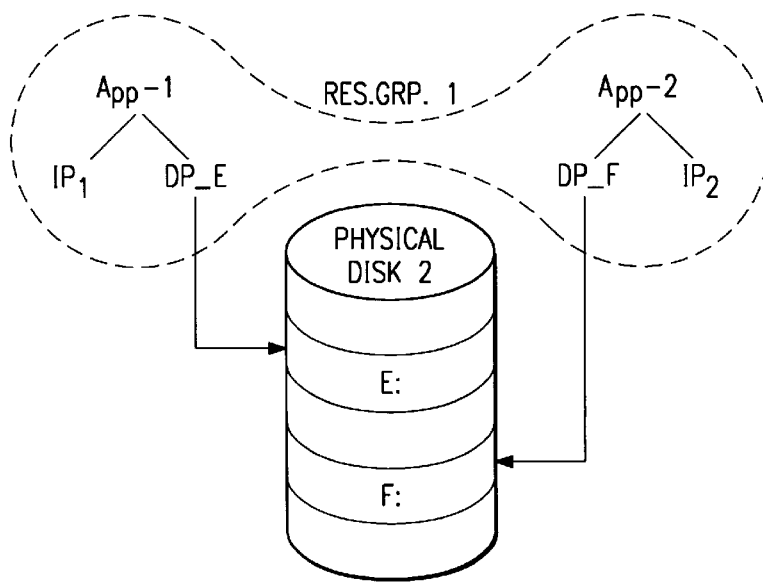
FIG. 5

NEXT VIEWS: HARDWARE

HIGHLY AVAILABLE APPLICATION CONFIGURATION

APPLICATION: | web_server | ~30

OPTIONAL COMMENT: | | ~32

PRECONFIGURED APPLICATIONS

START COMMAND: | dbgo.cmd | ~34

STOP COMMAND: | dbstop.cmd | ~36

ADDITIONAL PARAMETERS

RESOURCES COLLOCATED WITH THIS APPLICATION RESOURCES
- web_server
- duckhorn
- sd1_1
~40

ALL APPLICATIONS
- web_server
- cluster_manager
~38

ALL IP ADDRESSES
- duckhorn
- sterling
~42

ALL DISK PARTITIONS
- sd1_1
~44

COMPUTERS THAT CAN RUN THIS APPLICATION
- lajota

ALL CLUSTER COMPUTERS
- montelena
- lajota
- lakespring
- beaulieu

[OK] [Cancel] [Help]

Help

*FIG. 4*

AUTOMATIC RESOURCE GROUP FORMATION AND MAINTENANCE IN A HIGH AVAILABILITY CLUSTER CONFIGURATION

BACKGROUND OF THE INVENTION

1. Technical Field

The present invention relates generally to fault-tolerant computer networks and more particular to techniques to manage a set of resources in such a network to ensure that the resources remain available as a "group" to provide uninterrupted processing of software applications.

2. Description of the Related Art

It is known in the art to implement certain computer resources in a network in a redundant fashion for fault tolerance. One such technique involves a so-called "cluster" configuration wherein a given node of the network and its associated resources (e.g., its processor and disk drives) are essentially "mirrored" to ensure redundancy. A "highly-available" cluster typically includes a pair of nodes A and B, both of which can be doing active work. In the event of a failure of either node, the other node is capable of taking over some or all of the work of the failed node. A fully-redundant cluster configuration is one in which there are no single points of failure within the cluster configuration because the nodes, the data and the network itself are replicated for availability.

Tools for managing cluster configurations are also known in the art. Typically, a cluster is managed using a construct commonly referred to as a "resource group." A resource group is a set of highly-available resources, such as applications, network addresses and disks, which are expected to be taken over by a backup computer in the event of a failure of the primary computer. These resources are said to be in a "group" because it is necessary that they move together in a coordinated manner to the same backup system. In other words, the resources in a resource group need to "stay together" or be "collected" on the same computer at all times. Typically, a user is asked to define the contents of a resource group. This approach, however, creates serious problems. One main problem with user management of resource groups is that the users do not always get the membership of a particular resource group correctly defined. It is essential that all applications and their related resources be in the same resource group if they share any resources. By way of example, assume that the computer network includes a number of workstations running DB/2™ and Lotus Notes®. If these programs share the same IP address, then they need to be in the same resource group because a particular IP address cannot be taken over by two different computers. This need to create a sharing relationship between the applications, however, may be unknown to the user. A more subtle problem exists when the cluster configuration itself forces some type of artificial sharing that is less evident to the user creating the resource group. An example of this is when the implementation restricts disk takeover such that only a single computer can have control (and access to) a disk. In this example, the configuration itself mandates that all partitions on that disk can be taken over only by the same computer. As a result, there is "artificial sharing" between those applications that happen to use partitions residing on the same disk. This forces these applications to be collocated even though they do not appear, at first, to be sharing anything. If the administrator defining the resource group is not aware of this requirement, the resources group definition will encounter takeover failures under the right conditions.

Maintenance of the various resources in the cluster configuration often exacerbates the problem. For example, if a system administrator reorganizes which partitions fit on which disks, or if she changes the IP addresses used by various applications, such actions could affect the content of one or more previously-defined resource groups. It may not be apparent to the person carrying out these maintenance tasks that any resource group is being altered. Under appropriate circumstances, however, a key resource may not be in the appropriate resource group when it is needed, which is unacceptable.

SUMMARY OF THE INVENTION

It is thus a primary object of the invention to provide an "automatic" mechanism to define resource groups in a high availability cluster network configuration.

It is another principal object of the invention to generate and restructure resource groups without manual intervention by a system administrator.

It is still another object of the invention to ensure that resource group definitions for a cluster configuration are correct, and are easier and safer to maintain as network configurations change.

It is thus a more general object to provide a high availability cluster network configuration in which a management tool is provided to more easily define resource groups.

Yet another important object of the invention is to simplify the management tasks of system administrators in a highly-available cluster network configuration.

Still another object of the invention is to reduce the maintenance costs associated with supporting a highly-available multi-cluster computer networking environment.

Another general object and by-product of the invention is to ensure greater availability of a customer's software applications due to enhanced resource group formation and maintenance.

These and other objects of the invention are provided by a mechanism that automatically generates and maintains resource groups for the cluster configuration. As used herein, the resource groups are said to be generated "automatically" because the system administrator preferably is not directly involved with defining what resources go within a particular resource group. Rather, the administrator merely identifies a set of resources that must be collocated with a given application in the event of a failure of a computer on which the application is then executing. The system tool described herein then automatically generates one or more resource groups using a set of collocation "constraints" or rules. A first collocation constraint preferably enforces any user-defined collocations for a given application, and a second constraint collocates disk partition resources residing on the same physical disk. A resource group generated is this manner ensures effective fault-tolerant operation, and it is easy to maintain. In particular, in response to any reconfiguration of a cluster-wide resource, the tool evaluates whether the reconfiguration impacts any existing resource group. If so, the system administrator is notified to take corrective action, or such action may be effected automatically.

According to another more specific aspect of the invention, a method for using cluster-wide resources in a computer network is also described. The computer network is preferably configured in a cluster having fully- or at least partially-redundant nodes, data and network connections. The method begins by generating resource groups. In particular, for each of a plurality of applications whose processing is to be uninterrupted, a user (such as a system administrator) identifies a set of resources that must be collocated with each such application in the event of a failure of a computer on which the application is then executing. The one or more resource groups are then generated, as noted above, using collocation rules and without direct input from the system administrator. Preferably, each resource group includes one or more of the plurality of applications and their related resources. Then, upon a given fault occurrence, the method transfers control of the resources of a resource group to a backup computer.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a representative high availability cluster configuration in which the present invention is implemented;

FIGS. 2–3 are block diagrams of representative resource groups established by a user's collocation requirements;

FIG. 4 is a portion of a representative user interface for use by a system administrator to define a collocation of resources to be associated with a particular application;

FIG. 5 is a block diagram of resource group formation as a result of two user-defined collocations involved disk partitions on the same disk;

DETAILED DESCRIPTION OF THE PREFERRED EMBODIMENT

Figure 6:
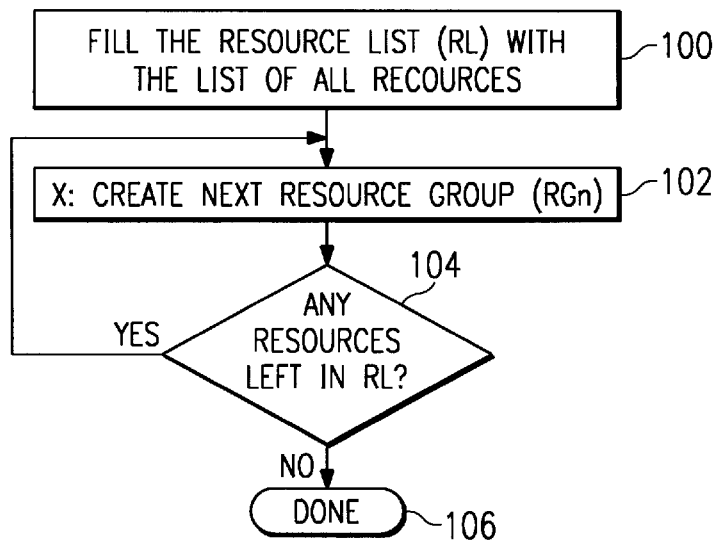
FIG. 6 is a flowchart of the procedure for automatic resource group formation according to the present invention.

Referring now to FIG. 1, a block diagram illustrates a high availability cluster configuration in which the present invention is implemented. The configuration shown in FIG. 1 is designed to be "fully redundant," which means that there are no single points of failure within the configuration. Full redundancy means that each of the nodes, the data and the network connections are replicated for availability. To this end, the configuration in FIG. 1 comprise a dual networks 10 and 12, nodes A and B, and a pair of mirrored disks 14 and 16 connected via dual shared SCSI buses 18 and 19. Node A has an associated disk store 20 and node B has an associated disk store 22. In a "mutual takeover" scheme, both nodes A and B can be active doing work. In the event of a failure of either node, the other node is capable of taking over some or all of the work of the failed node. In this scheme, a failed node may be reintegrated into the cluster when it recovers, with the redistribution of workload then being determined by a rejoin policy. Alternatively, in a "standby" scheme, the takeover or redundant node is not performing other work, but rather is dedicated to being ready to perform the job of the primary node. While this mode of use has the disadvantage of requiring a dedicated standby resource, it has the advantage of allowing the standby node to prepare for its takeover role. For example, the takeover application may already be started and the disk and network connections in some degree of enablement. This can reduce takeover time. This readiness is sometimes referred to as the "warmness" of the standby node. In a true fault tolerant configuration, the standby node is so ready it is sometimes referred to as a "hot" standby.

According to the invention, each of the nodes may comprise a computer, such as an IBM RISC System/6000 computer (a reduced instruction set of so-called RISC-based workstation) running the AIX (Advanced Interactive Executive Version 4.1 and above), or an Intel-based processor system running the Windows NT or OS/2® operating system. The computer includes a graphical user interface (GUI) for management and administration. The various models of the RISC-based computers are described in many publications of the IBM Corporation, for example, RISC System/6000, 7013 and 7016 POWERstation and POWERserver Hardware Technical Reference, Order No. SA23-2644-00. AIX OS is described in AIX Operating System Technical Reference, published by IBM Corporation, First Edition (November 1985), and other publications. While the above platform is useful, any other suitable hardware/operating system combinations may be used. Thus, for example, suitable alternative machines include: an IBM-compatible PC 486 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3.

According to the invention as discussed above, a plurality of cluster-wide "resources" are configured into so-called "resource groups." In particular, the preferred implementation includes three (3) basic types of "resources," namely applications, IP addresses and disk partitions. Other resource "types" may also be substituted or used in conjunction therewith. In the context of the present invention, a resource is associated with other resources via a so-called "collocation." A collocation link is a binary link between an application (which itself is a resource) and another resource (e.g., an IP address, disk partition, etc.). FIG. 2 illustrates an exemplary resource group having applications A, B and C, IP addresses IP1 and IP2, and a disk partition Disk P_F. The lines identified in the graph represent collocation requirements that, according to the present invention as will be described, are initially specified by the system administrator. FIG. 3 illustrates another exemplary resource group comprising application D, IP address IP3 and disk partition Disk P_G. Again, the lines represent collocation requirements specified by the user. It should be appreciated, however, that FIGS. 2 and 3 represent exemplary resource groups that have not be fully "configured" according to the present invention.

To this end, the present invention "automatically configures" resources into resource groups, preferably by implementing a pair of collocation "constraints" or rules as set forth below:

(a) collocated resources have the same resource group; and (b) partitions within the same disk have the same resource group.

Rules (a) and (b) are not meant to be limiting, as one or more other constraints or rules may be added or substituted. Thus, for example, a constraint may be "performance" based such that certain applications are maintained in a group based on performance considerations. Another type of constraint may enforce some hardware dependency, and so forth. As can be seen, rule (a) set forth above ensures that any user-defined collocation is enforced. FIG. 2 or 3, as noted above, illustrates how a resource group would look if only rule (a) were enforced.

FIG. 4 is a user interface menu displayed on the display screen of the computer. This menu includes a plurality of text boxes, frames and controls to enable the system administrator to associate cluster-wide resources with a particular application. The particular layout of the management screen is merely exemplary. In operation, the administrator enters the name of an application (in this case "web_server") in an Application name field 30. Comments may be entered in an "Optional Comment" field 32. The administrator may enter start and stop commands in the command fields 34 and 36. According to the present invention, the administrator then enters the identification of one or more resources that he or she intends to be collocated with the application. Although not meant to be limiting, this operation may be accomplished by having the administrator first highlight an entry in the "All Applications" menu 38. This menu includes all cluster applications sought to be managed. Since the web_server application is part of the resource group, the user highlights this entry in menu 38, causing it to be automatically copied into an Application Collocation menu 40. Alternatively, the application entry in line 30 may be the default entry in the Collocation menu 40. Similarly, the user may then select an IP address for collocation from an "All IP Addresses" menu 42, and a disk partition from the "All Disk Partitions" menu 44. The entries selected are then shown as copied into the Collocation menu 40. Thus, as illustrated in FIG. 4, a system administrator defines the resources that he or she intends to be collocated with a given application. The administrator, however, does not directly define the resource group itself.

With reference now to FIG. 5, it can now be seen how the collocation constraint is used to help generate a resource group automatically. It is assumed that the administrator has used the interface technique of FIG. 4 to generate the collocation requirements for a first application "App_1," which as noted above was "web_server." This application has an IP address (IP1) called "duckhorn" and a disk partition (DP_E) called "sd1_1." It should also be assumed that the administrator created collocation requirements for a second application "App_2" including IP2 and DP_F. If disk partitions E and F are on the same physical disk as illustrated in FIG. 5, collocation constraint (b) as discussed above now forces the generation of a new resource group comprising all of the resources illustrated. As can be seen, applications App_1 and App_2 are forced into the same resource group even though they share no logical resources.

The process of automatically forming resource groups is now described in more detail. The process uses the following definitions:

Resource List (RL): initially, the set of all resources;

Resource Group n (Rgn): the set of resources making up resource group n; and

Required Resource List (Rqd): the set of resources found to be required by some resource already in the resource group The overall process begins as illustrated in the flowchart of FIG. 6. At step 100, the Resource List is filled in with the list of all resources. The routine then continues at step 102 to create a next Resource Group (Rgn). This method is described below in FIG. 7. After step 102, the routine tests at step 104 to determine whether there are any resources left in the Resource List RL. If the outcome of the test at step 104 is positive, the routine returns and repeats step 102. This creates a next Resource Group. If, however, the outcome of the test at step 104 is negative, this means that there are no resources left in the Resource List, and thus the routine terminates as indicated by block 106.

Figure 7:
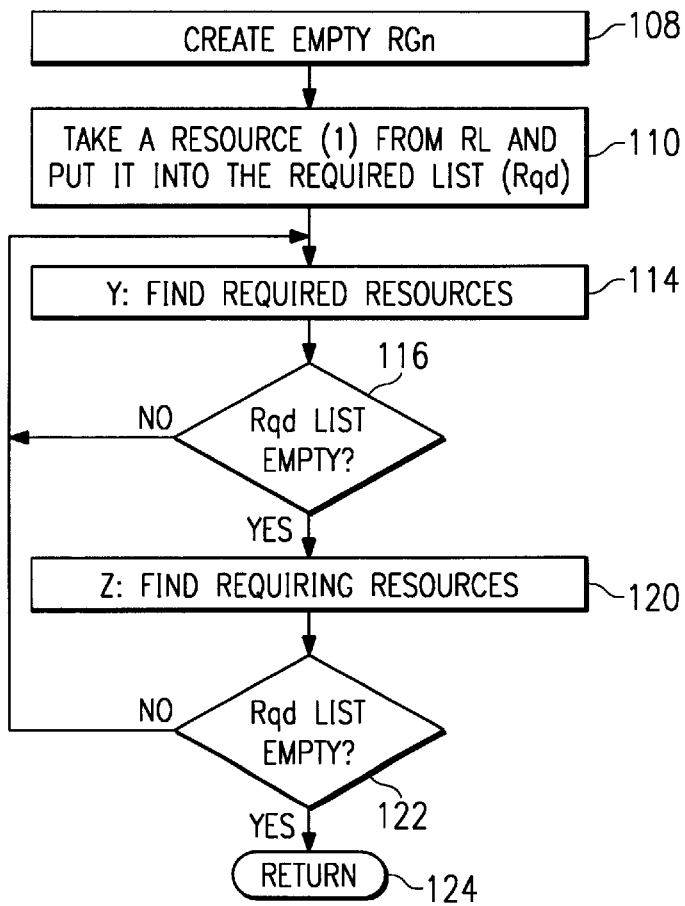
FIG. 7 is a flowchart of the Create Next Resource Group subroutine of the flowchart of FIG. 6.

The step of creating a next Resource Group (i.e. step 102 in FIG. 6) is illustrated in more detail in the flowchart of FIG. 7. The routine begins at step 108 by creating an empty next Resource Group Rgn data structure. At step 110, the routine takes a resource from the Resource List and puts it into the Required Resource List Rqd for the Resource Group. Preferably, the resource selected is an application resource, although this is not a requirement. At step 114, the routine then goes and finds the resources required by the resource taken from the Rqd list. This substep, referred to as Find Required Resources, finds the subtree of resources required by any resource and is described in more detail below in FIG. 8. After step 114, a test is performed at step 116 to determine whether the Rqd list is then empty, meaning that all the entries in that list have been processed. If the outcome of the test at step 116 is negative, additional entries still exist in the Rqd list, and thus the routine branches back to step 112 and recycles. If, however, the outcome of the test at step 116 is negative, there are no more additional entries in the Rqd list, and thus the routine continues. In particular, a step 120 is then performed to Find Requiring Resources. This step, as will be described in more detail below in FIG. 9, finds any immediate resources outside of the currently known resources in the resource group which need any of the resources in this Resource Group. After step 120, another test is performed at step 122 to determine whether the Rqd list is empty. If not, the routine again branches back to step 112 and recycles. If, however, the result of the test at step 122 indicates that there are no more entries in the Rqd List to be processed for Requiring Resources, the routine returns as indicated at block 124.

Figure 8:
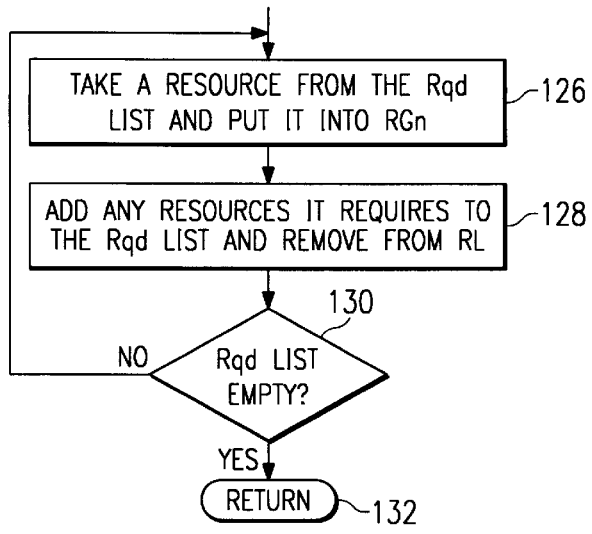
FIG. 8 is a flowchart of the Find Required Resources subroutine of the flowchart of FIG. 7.

Referring now to FIG. 8, a flowchart is shown of the Find Requiring Resources routine. As noted above, this routine finds the subtree of resources required by any resource. In a preferred embodiment, picking only application resources optimizes the process since all resources typically are required by an application resource. The routine begins at step 126 by taking a resource from the Rqd List and putting it into the Rgn data structure. The routine continues at step 128 to add any resources it requires to the Rqd List and remove them from the Resource List. The routine then tests at step 130 whether the Rqd List is empty. If the result of the test at step 130 is negative, meaning that more entries need to be processed, the routine returns to step 126 and recycles. If, however, the outcome of the test at step 130 is positive, all entries have been processed and the routine returns as indicated by block 132.

Figure 9:
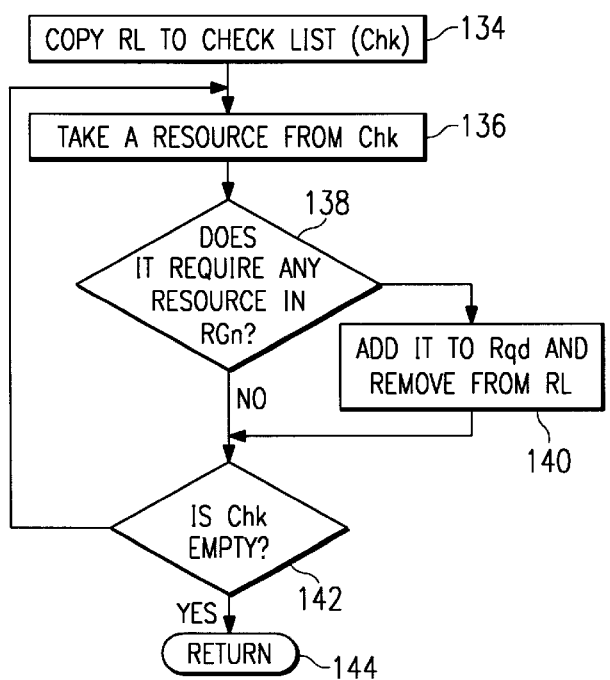
FIG. 9 is a flowchart of the Find Requiring Resources subroutine of the flowchart of FIG. 7.

The Find Requiring Resources routine is illustrated in the flowchart of FIG. 9. As noted above, this routine finds any immediate resources outside of the currently known resources of the resource group which need any of the resources in this group. This routine locates owning and intersecting trees or resources in an iterative manner. It begins at step 134 by copying the Resource List to a Check List (Chk) data structure. At step 136, the routine takes a resource from Chk. A test is then performed at step 138 to determine whether the resource requires any resource in Rqn. This step uses the collocation constraints described above. If the outcome of the test at step 138 is positive, the routine branches to step 140, wherein the routine adds the resource to Rqd and removes it from the Resource List. If, however, the outcome of the test at step 140 is negative, or following step 140, the routine then checks at step 142 to see whether Chk is empty, meaning that all entries therein have been processed. If the outcome of the test at step 142 is negative, other entries must still be analyzed and thus the routine returns to step 136 and recycles. If, however, the outcome of the test at step 142 is positive, the routine returns as indicated by block 144. This completes the high level processing.

The present invention thus envisions automatic generation of resource groups. By "automatic generation," it is meant that the invention computionally assigns each resource to a resource group in such a way that the resource groups formed are as small as possible subject to the constraint that each set of resources required to be collocated (by a collocation requirement) is completely contained within one resource group. Thus, human involvement in this process is preferably limited to the specification of the collocation requirements.

It should further be appreciated that the flowcharts set forth above implement the automatic resource group generation in a "resource-centric" manner. One of ordinary skill will recognize that it is also possible to implement the automatic generation of resource groups in a "collocation-centric" manner. In the latter case, the implementation loops over collocations and over lists of disk partitions residing on the same disks (which may be referred to as disk collocations), instead of looping over resources and then over relevant collocations and possibly relevant disk partitions. Thus, resource groups may be computed and maintained by processing collocations (including disk collocations) to assign resource group names to the resources mentioned in the collocations.

The following pseudocode describes various methods implemented according to the present invention using the collocation relationships to optimize the formation of the resource groups. Generally, a resource group is formed by assigning the same name to each of its member resources. In response to a new collocation, it may be necessary to merge resource groups by assigning the name of the first group to all the members of the second group (and deleting the name of the second group from the list of names of resource groups). When a collocation is removed, it is necessary to recompute the resource group in which the elements related by the collocation are members. This simpliest way to do this is to assign new names to all the members of the resource group and the re-process all collocations, merging groups as necessary.

This first instruction set responds to the addition of a new collocation link (A, B):

```
rga = resource group of A;
rgb = resource group of B;
if (rga ≠ rgb) Merge (rga, rgb);
if (B is a disk partition)
{
    c = disk of B:
    dp = first disk partition of C;
    rgc = resource group of dp;
    if (rga ≠ rgc) Merge (rga, rgc);
}
```

The logic between the { } brackets tests to determine whether the two resource groups share partitions on the same physical disk. If so, the resource groups get merged as illustrated in FIG. 5.

The following instructions respond to the removal of a collocation link (A, B):

```
rg = resource group of A;
K = list of applications with resource group rg.
L = list of resources with resource group rg;
for each resource in L
{
    form a clone of rg and assign it as the resource group of res;
}
for each application in K:
{
    M = list of collocations of form (app,*);
    for each collocation in M (apply Response to addition of collocation
(above) }
    N = list of collocations of form (*, app);
    for each collocation in N {apply Response to addition of collocation
(above) }
}
```

In the above, it should be noted that a clone of a resource group is just another resource group with the same policies and user-supplied comments.

The subroutine "Merge (rga,rgb)" referred to above has the effect of replacing all occurrences of the rgb by rga and deleting resource group rgb. Its policies and comments are then lost. For performance reasons, it may be desirable to assign a NULL resource group to all non-application resources that are not collocated with some application. If rgb is NULL in the application of Merge (rga, rgb), then it only needs to be replaced by rga (as no global replacement is needed). NULL cannot be allowed as an argument to Merge, so the appropriate replacement must be performed instead of the call to Merge. The following pseudocode is a performance optimization again using collocation relationships to optimize the formation of the resource groups:

Response to the addition of a new collocation link (A, B):

```
rga = resource group of A;
rgb = resource group of B;
if (rga ≠ rgb)
{
    if (rgb==NULL) resource group of B = rga;
    else Merge (rga, rgb);
}
if (B is a disk partition)
{
    C = disk of B;
    dp = first disk partition of C:
    rgc = resource group of dp;
    if (rga ≠ rgc)
```

-continued

```
{
    if (rgc==NULL) resource group of dp = rga;
    else Merge (rga, rgc);
  }
 }
}
```

Response to the removal of a collocation link (A, B):

```
rg = resource group of A;
K = list of applications with resource group rg.
for each application in K
{
    form a clone of rg and assign it as the resource group of
application;
}
for each application in K
{
    M = list of collocations of form (app,*);
    for each collocation in M {apply Response to addition of
collocation (above) }
    N = list of collocations of form (*,app):
    for each collocation in N {apply Response to addition of
collocation (above) }
}
```

Figure 10:
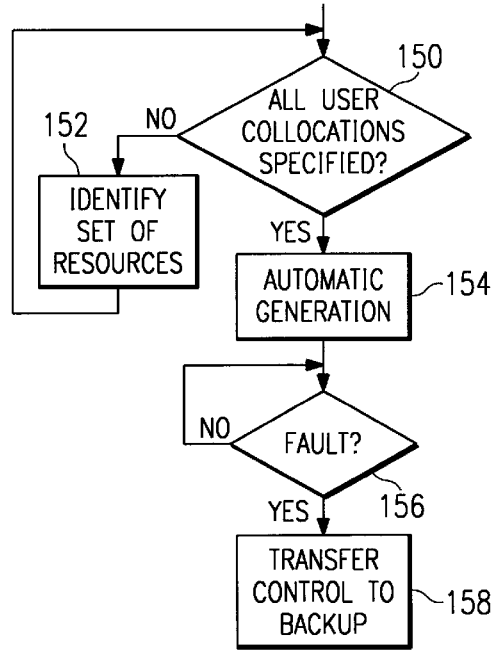
FIG. 10 is a flowchart of a method of transferring cluster resources in a resource group to a backup computer according to the invention.

FIG. 10 is a simplified flowchart of a method using cluster-wide resources to provide uninterrupted processing software applications according to the invention. At step 150, a test is first done to determine whether all user collocation specifications have been made for the applications. If the outcome of the test at step 150 is negative, the routine continues at step 152. At this step, and for a given application, a user identifies the set of network resources that must be collocated. The routine then returns to step 154 to automatically generate the resource groups. At step 156, a test is made to determine whether a fault event has occurred in the network that impacts an application. If the outcome of the test at step 156 is negative, the routine cycles. If the outcome of the test at step 156 is positive, however, the routine continues at step 158 to transfer control of the resources of a resource group to a backup computer.

The present invention thus solves a number problems of prior art cluster configurations, such as HA/CMP for AIX operating system environment. According to the invention, the system administrator is generally prohibited from directly defining the contents of a resource group. Rather, the user simply tells the system (using a conventional GUI) for each application the other resources (IP addresses, partitions, other applications) which the user knows must be "collocated" with the application. Thus, the user needs to only focus on the application, which he or she might be expected to understand better than the more abstract notion of a resource group. The cluster configuration routine examines the direct and indirect (artificial) resource sharing in all the application definitions and automatically forms resource groups consisting of those applications and their related resources which have any type of dependencies (even implementation defined ones). This operation thus enforces the transitive closure of all resource collocation dependencies. If the user later performs any reconfiguration (for example, changes IP addresses, disk/partition contents, collocation requirements, or the like) the invention evaluates the effect on the resource groups, notifies the user of the impact, and may instruct the administrator what must be done to maintain the cluster. Thus, for example, the administrator is provided with a message query, such as "You no longer need to have DB/2 and Lotus Notes in the same resource group. Do you want to let them be in their own groups now?" Depending on the response, the invention reconfigures the affected resource groups.

One of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by Letters Patent is set forth in the following claims:

What is claimed is:

1. A method of using cluster-wide resources in a computer network having a plurality of nodes to provide uninterrupted processing of software applications, comprising the steps of:

for each of a plurality of applications whose processing is to be uninterrupted, having a user identify a set of resources that must be collocated with each such application in the event of a failure of a computer on which the application is then executing;

automatically generating one or more resource groups, each of which includes one or more of the plurality of applications and their related resources; and upon a given occurrence, transferring control of the resources of a resource group to a backup computer.

2. The method as described in claim 1 wherein the set of resources includes resources selected from the group consisting of applications, IP addresses and disk partitions.

3. The method as described in claim 1 wherein the step of automatically generating one or more resource groups computationally assigns each resource to a resource group in a predetermined manner such that the resource groups are as small as possible and each set of resources required to be collocated is completely contained within a given resource group.

4. The method as described in claim 1 wherein the step of automatically generating one or more resource groups includes enforcing a set of collocation constraints.

5. The method as described in claim 4 wherein the collocation constraints include user-defined collocations for a given application.

6. The method as described in claim 4 wherein the collocation constraints collocate disk partition resources residing on a physical disk.

7. A method of configuring cluster-wide resources in a computer network having a plurality of nodes to facilitate uninterrupted processing of software applications, comprising the steps of:

for each of a plurality of applications whose processing is to be uninterrupted, having a user identify a set of resources that must be collocated with each such application in the event of a failure of a computer on which the application is then executing; and automatically generating one or more resource groups, each of the one or more resource groups comprising one or more of the plurality of applications and their related resources.

8. The method as described in claim 7 wherein the set of resources includes resources selected from the group consisting of applications, IP addresses and disk partitions.

9. The method as described in claim 7 wherein the step of automatically generating one or more resource groups includes enforcing a set of collocation constraints.

10. The method as described in claim 9 wherein the collocation constraints include user-defined collocations for a given application.

11. The method as described in claim 9 wherein the collocation constraints collocate disk partition resources residing on a physical disk.

12. A method of managing cluster-wide resources in a computer network having a plurality of nodes to facilitate uninterrupted processing of software applications, comprising the steps of:

for each of a plurality of applications whose processing is to be uninterrupted, having a user identify a set of resources that must be collocated with each such application in the event of a failure of a computer on which the application is then executing;

automatically generating one or more resource groups, each of which includes one or more of the plurality of applications and their related resources;

in response to any reconfiguration of a cluster-wide resource, evaluating whether the reconfiguration impacts any resource group; and if the reconfiguration impacts any resource group, notifying the user.

13. The method as described in claim 12 wherein the notifying step provides the user with information indicating how the resource group is impacted.

14. The method as described in claim 12 wherein the set of resources includes resources selected from the group consisting of applications, IP addresses and disk partitions.

15. A computer program product in a computer-readable medium for use in a data processing system to manage cluster-wide resources in a computer network, comprising:

first program data means responsive to user input for identifying a set of resources that must be collocated with an application in the event of a failure of a computer on which the application is then executing; and second program data means responsive to the user input and a set of collocation constraints for generating one or more resource groups.

16. The computer program product as in claim 15 wherein the second program data means implements user-defined collocations for a given application.

17. The computer program product as in claim 15 wherein the second program data means collocates disk partition resources residing on a physical disk.

18. In a computer network having a primary computer and a backup computer, a method of using cluster-wide resources to provide uninterrupted processing of software applications, comprising the steps of:

for each of a plurality of applications whose processing is to be uninterrupted, having a user identify a set of resources that must be collocated with each such application in the event of a failure of the primary computer;

automatically generating one or more resource groups, each of which includes one or more of the plurality of applications and their related resources; and upon a given occurrence at the primary computer, transferring control of the resources of a resource group to the backup computer.

* * * * *